United States Patent [19]
Feldman, Jr.

[11] Patent Number: 5,220,462
[45] Date of Patent: Jun. 15, 1993

[54] DIODE GLAZING WITH RADIANT ENERGY TRAPPING

[76] Inventor: Karl T. Feldman, Jr., 1704 Stanford Dr. NE., Albuquerque, N. Mex. 87106

[21] Appl. No.: 792,883

[22] Filed: Nov. 15, 1991

[51] Int. Cl.$^5$ .................. G02B 5/10; G02B 17/00
[52] U.S. Cl. .................. 359/855; 359/857; 359/852; 359/619; 359/627; 359/350; 136/246; 250/517.1; 126/684
[58] Field of Search .............. 359/856, 855, 858, 852, 359/867, 619, 627, 350; 126/438; 428/919; 136/246; 250/517.1

[56] References Cited

U.S. PATENT DOCUMENTS

| | | | |
|---|---|---|---|
| 1,311,087 | 7/1919 | Olmsted | 359/402 |
| 2,362,786 | 11/1944 | Williams | 428/919 |
| 3,923,381 | 12/1975 | Winston | 359/852 |
| 4,045,246 | 8/1977 | Mlavsky et al. | 359/867 |
| 4,059,094 | 11/1977 | de Mendoza | 126/439 |
| 4,284,067 | 8/1981 | Kilar | 126/436 |
| 4,541,414 | 9/1985 | Mori | 359/867 |
| 4,690,355 | 9/1987 | Hornung et al. | 136/246 |
| 4,964,713 | 10/1990 | Goetzberger | 359/867 |

*Primary Examiner*—Jon W. Henry
*Attorney, Agent, or Firm*—Richard A. Bachand

[57] ABSTRACT

A transparent glazing material with a plurality of concentrating lenses on its top surface such that incident radiation on the top surface is focused to pass through apertures in a corresponding plurality of integral reflective surfaces with a plurality of segments of thermal insulating material arranged directly beneath the reflective surfaces along the bottom of the transparent material in a pattern with apertures in the reflective and insulating materials located directly below each lens such that incident radiation on the top surface is focused by the lenses and passes through the holes in the reflectors and insulation and out the bottom. Radiation in the direction opposite to the incident radiation will strike the bottom of the reflectors and be reflected back from the bottom.

40 Claims, 5 Drawing Sheets

DIODE GLAZING WITH RADIANT ENERGY TRAPPING

BACKGROUND OF THE INVENTION

1. Field of the Invention

This invention pertains to an improved article of manufacture that is intended for use in controlling the passage of radiant energy for such uses as glazing or the like.

2. Background and References

"Diode glazing" is a transparent glazing that allows incident radiant energy to pass freely in the incoming direction, but allows very little radiation or conduction heat transfer to pass in the opposite direction. Diode glazing is a thin, light weight, transparent material that can be used in nearly any glazing application in which it is desirable to allow transmission of incident radiation and to suppress radiation and conduction heat transfer in the opposite direction, over a wide band of radiation wave lengths, including radar, infrared, visible light, and ultraviolet wavelengths.

For example, in a greenhouse or solar collector, it is desirable to have a glazing which allows as much as possible of the incident sunlight to pass inside, but which minimizes the radiation, convection and conduction heat loss to the outside. Ordinary glass is naturally transparent to sunlight but is somewhat opaque to infrared radiation of longer wavelength emitted from within the greenhouse, so ordinary glass naturally acts as a partially effective radiation diode or trap. This effect is called "the greenhouse effect."

In the past some features related to diode glazing (glazing that allows incident radiant energy to pass freely in the incoming direction, but that opposes radiation or conduction heat transfer in the opposite direction) have been described.

U.S. Pat. No. 4,053,327 to Meulenberg describes a cover for photovoltaic cells which refracts incident sunlight away from opaque electrical conductor grid lines and onto active cell areas in order to improve performance. This cell cover is designed for flat-plate, non-concentrating photovoltaic cells.

U.S. Pat. No. 4,307,711 to Doundoulakis describes a tracking solar collector with an array of light focusing elements to provide a linear array of focused light that passes through small glass covered apertures in an evacuated insulated tube finally to be absorbed on a heat exchanger tube.

U.S. Pat. No. 4,323,053 to McCullough et al. describes a transparent honeycomb glazing for solar collectors which is intended to act as a heat trap glazing, as a result of the greenhouse effect. The honeycomb cells of still air are also intended to provide thermal resistance to heat losses from within the solar collector.

U.S. Pat. No. 4,412,528 to Elzinga describes a double-pane window with fluorescent material on strips between the panes to absorb and re-emit radiation which is then transferred by total internal reflection to a heat storage means at one edge of the window. The window is intended to collect and store solar heat for useful purposes.

U.S. Pat. No. 4,711,972 to O'Neill describes a solar energy collector for converting concentrated solar energy into electricity through the use of photovoltaic cells. O'Neill also includes a photovoltaic cell cover for enhancing the performance of photovoltaic cells. The cell cover concentrates radiant energy into the active region of the photovoltaic cells and eliminates the losses that normally occur when radiant energy falls on the opaque electrical conductor grid lines of the photovoltaic cells.

None of the patents described above provide collection and trapping of incident radiant energy by the use of reflectors or by a combination of lenses and reflectors, nor do they provide thermal resistance to radiation and conduction heat losses. Neither have any previous technical articles been found which provide such features. Accordingly, there is a need for an improved glazing material that can provide these features and thus improve the efficiency of glazing used on greenhouses, solar collectors, passive solar buildings, natural lighting of buildings, and IR signature suppression applications.

SUMMARY OF THE INVENTION

In light of the above, it is, therefore, an object of the invention to provide an article of manufacture that acts as a "check valve", or diode, for radiant energy that allows the energy to pass in one direction to a significantly greater extent than in the opposite direction.

It is another object of the invention to provide an article of manufacture of the type described that can be used as a transparent glazing.

It is another object of the invention to provide an article of manufacture of the type described that provides improved light trapping more effectively than greenhouse glass and also provides a large thermal resistance to conduction heat losses.

It is yet another object of the invention to provide an article of manufacture of the type described that can have as high a transmittance to incident radiation as glass, but has several times higher opaqueness to radiation and thermal resistance to conduction heat transfer in the opposite direction.

It is yet another object of the invention to provide an article of manufacture of the type described that can accept incident radiation within a specified range of acceptance angles and reject radiation outside this range.

It is still another object of the invention to provide an article of manufacture of the type described that can focus transmitted radiation in a desired direction over a range of angles.

It is still yet another object of the invention to provide an article of manufacture of the type described for collecting and trapping incident radiant energy by the use of reflectors or by a combination of lenses and reflectors.

It is still another object of the invention to provide an article of manufacture of the type described that can provide multispectral radiation trapping or absorbing.

It is still yet another object of the invention to provide an article of manufacture that can reduce the radiation emitted from a warm surface, thus reducing the infrared "signature" of the surface.

It is yet another object of the invention to provide an improved glazing material.

It is still another object of the invention to provide an improved glazing material that provides a heat trapping effect that can improve the thermal efficiency of solar collectors, solar water heaters, solar space heaters, Trombe walls, solar heated buildings, greenhouses, and the like.

These and other objects, features and advantages of the invention will be apparent to those skilled in the art from the following detailed description of the invention, when read in conjunction with the accompanying drawings and appended claims.

In accordance with a broad aspect of the invention, an article of manufacture is presented that includes a radiation transparent material and a plurality of spaced reflectors below the top surface of the material. The reflectors are arranged to reflect incident radiation toward the direction of their bottom surfaces, and, in conjunction with the radiation transparent material, to concentrate incident radiation into the spaces between the reflectors. The radiation transparent material can be formed of a glazing material with a smooth top surface with the reflectors formed to focus the radiation into the spaces between the reflectors, or the radiation transparent material can be formed with a lens configuration to itself focus the radiation.

In accordance with another broad aspect of the invention, a transparent glazing structure is presented that includes a transparent material with a smooth top surface and a bottom surface. A plurality of integral reflective surfaces are arranged below the top surface of the transparent material in a pattern with spaces between each reflector. Most of the incident radiation on the top surface is channeled through the spaces and out the bottom, and most of the radiation passing in the direction opposite to the incident radiation will strike the bottom of the reflectors and be reflected back out from the bottom. The reflective surfaces can be differently configured, for example, as flat "V" shaped surfaces, or concave parabolic surfaces.

In one embodiment, a plurality of concentrating lenses are formed in the top surface of the transparent material configured to focus incident radiation on the top surface of the transparent material to pass through the spaces between the reflective surfaces. Substantially all of the radiation within a predetermined range of incidence angles upon the top surface of the transparent material passes through the transparent glazing structure, and most of the incident radiation upon the bottom surface of the transparent material is reflected to not pass through the transparent glazing structure. Substantially all of the incident radiation outside the predetermined range of acceptance angles will be rejected and not transmitted.

In another embodiment, a plurality of segments of thermal insulating material are arranged beneath the reflectors along the bottom of the body in a pattern with spaces between the segments of insulating material, the spaces being located to allow the focused radiation that passes through the spaces between the reflective surfaces to pass between the segments of insulating material and out the bottom of the body. Reflective surfaces can be provided on the bottom surfaces of the segments of thermal insulating material so that radiation in the upward or opposite direction toward the reflective surfaces is reflected to not pass the transparent glazing structure. Additionally, heat conduction in the opposite direction is substantially reduced by the thermal insulating material. Moreover, the spaces through which the incident concentrated radiation passes can be inclined at angles to direct the concentrated radiation at desired angles.

In accordance with another broad aspect of the invention, a method for reducing the IR signature of a structure, such as a vehicle or a building, is presented. In accordance with the method, a material having top and bottom surfaces is provided that is transparent to incident radiation thereupon. A plurality of spaced reflectors are provided below the top surface, the reflectors having top and bottom surfaces arranged whereby incident radiation on the top surface of the reflectors is channelled to spaces between the reflectors and incident radiation on the bottom surface of the reflectors is reflected out the bottom surface of the material.

Overall, the multilayer diode glazing structure will absorb nearly all incident radiation, but allow little radiation or heat conduction to pass in the opposite direction, thus providing a significant diode effect for radiant energy.

BRIEF DESCRIPTION OF THE DRAWINGS

The invention is illustrated in the accompanying drawings, in which.

In the various drawings, like reference numerals are used to denote like or similar parts. Additionally, the drawings are not necessarily drawn to scale, and cross-hatching in the cross sectional view has been omitted for clarity.

DETAILED DESCRIPTION OF THE PREFERRED EMBODIMENTS

Figure 1:
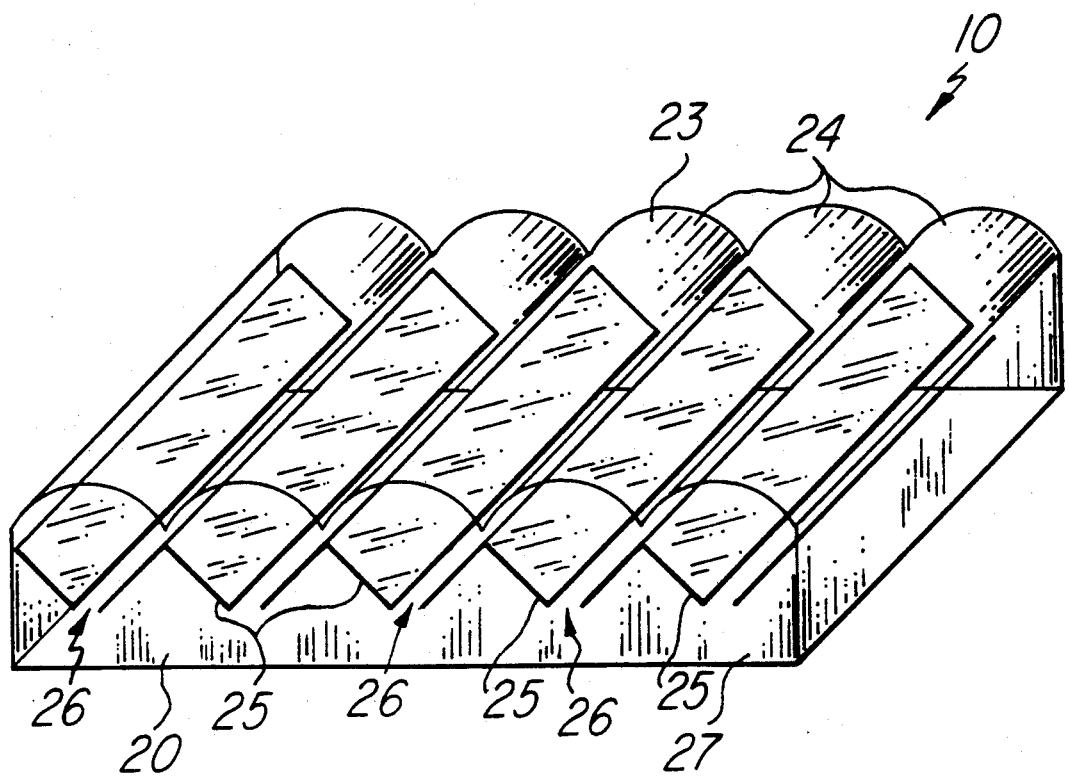
FIG. 1 is an isometric drawing of a diode glazing structure with inverted "V" shaped reflectors, in accordance with a preferred embodiment of the invention.
Figure 2:
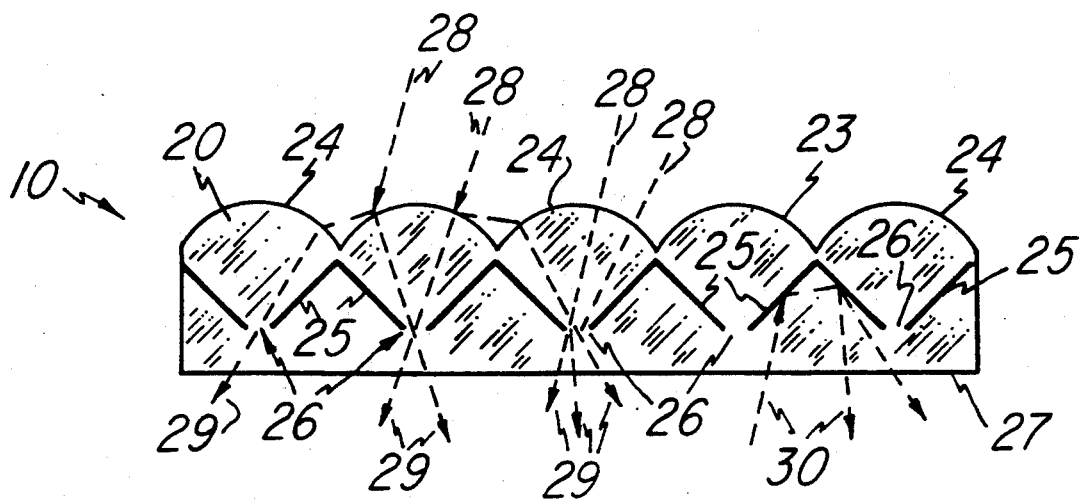
FIG. 2 is a side elevation view in cross-section of the diode glazing structure of FIG. 1.

With reference now to the drawings, and particularly to FIGS. 1 and 2, an improved diode glazing structure 10, in accordance with a preferred embodiment of the invention, has a generally planar body 20 of a transparent material, such as glass, plastic, acrylic, polycarbonate, clear silicone rubber, or other similar material. In the embodiment illustrated, the top surface layer of the planar body 20 presents a plurality of cylindrical shaped lens concentrators 24. The lens concentrators 24 may be separately provided, but preferably are formed as in integral part of the planar body 20, such as by an injection molding, extrusion process, or the like, forming a series of specially designed lenses on the outer surface of the top of the body 20 that collect and focus nearly all incident radiation inward into the body 20. The lens concentrators 24 may be of the convex type, the Fresnel type, the internally reflecting type, or some other type.

The function of the top surface of the structure is the efficient collection of radiation from all directions and over a range of incidence angles and to direct the radiation downward into the body 20. Any untreated flat surface will reflect about 5% of the light striking it at incidence angles from zero to about 50 degrees. At larger incidence angles the reflectance increases rapidly until it approaches 100% at an incidence angle of 90 degrees (parallel with the surface). Reflection can be reduced to about 1% over incidence angles up to about 50 degrees by the use of an antireflective coating. Further reduction in reflection is achieved by covering the surface with small lenses that have the property of collecting, concentrating and focusing most incident radiation inward through the glazing structure.

Thus an antireflective coating 23 is provided on the top surface of the lens concentrators 24. The antireflective coating is not essential to the operation of the diode glazing structure 10, but can be used in applications where maximum collection is needed.

Directly beneath each lens concentrator 24 is an inverted "V" shaped trapping reflector 25. The trapping reflectors 25 are arranged to provide slots or apertures 26 between adjacent trapping reflectors 25. The trapping reflectors 25 can be of any appropriate reflective material, such as aluminum foil, silver foil, or other high reflectivity material in the range of wavelengths required. The trapping reflectors 25 can be, for example a reflective layer made of silvered mylar film, for example, which has a reflectivity of approximately 95%; so 95% of the IR and visible radiation striking the reflective surface Will be reflected and trapped. If the diode glazing structure is directly attached to a hot surface, only the thermal insulation layer will have much effect to reduce conduction heat losses and the reflective surface on the bottom could not provide much benefit. But if the diode glazing structure can be placed a half inch or so from a hot surface, such as in a solar collector for example, the reflective surface will significantly reduce the radiation losses from the surface. The temperature of the diode glazing structure would also be lower than that of ordinary glazing, due to the IR radiation reflected from the bottom surface and the thermal resistance of the insulation layer.

In the embodiment shown, the trapping reflectors 25 are embedded within the body 20, whereby the body 20 has a flat bottom surface 27. The material of the body 20 below the trapping reflectors 25 may be omitted if desired; in which case, the trapping reflectors 25 would themselves provide the bottom surface of the glazing structure 10. The layer of the diode glazing structure 10 that includes the trapping reflectors 25 is called the trapping layer, and transmits nearly all incident radiation and reflects back, or traps, nearly all outgoing radiation. The trapping feature provided by the reflectors acts like a "check-valve" which allows incoming radiation to pass through but reflect most of the outgoing radiation back. The trapping layer could be made up of several superimposed layers, if desired, to obtain a higher degree of trapping.

The trapping reflectors 25 are spaced one from another to provide spaces or apertures 26 between them. The apertures 26 are arranged to be at or near the focal points of the various lens concentrators 24, so that light incident on the top surface of the body 20 is focused to pass through the apertures 26.

The operation of the diode glazing structure 10 can be seen with reference now to FIG. 2 where incident radiation 28 falls on the top surface of the body 20 and onto the lens concentrators 24. The radiation 28 passes through the antireflective coating 23, and is focused by the lens concentrators 24 to pass through the slots or apertures 26 between the trapping reflectors 25. The focused radiation 29 then passes out through the bottom surface 27. In contrast, radiation 30 in the opposite direction that strikes the bottom of the trapping reflectors 25 is reflected back also to pass out through the bottom surface 27.

It will be appreciated that the shape and the geometric pattern of the lenses and the reflectors may vary in accordance with the particular application for which use is intended. The dimensions of the lenses and the apertures in the reflective layer must be matched so that the radiation focused by a lens passes through the hole in the reflective material directly below. The lenses may be thin and nearly flat and not so sharply focused for thicker diode glazing. Thicker, more convex lenses with sharper focus may be used for thinner diode glazing. Also, a Fresnel type lens with many prismatic lens may be used for a thin glazing. The lens/reflector/insulator layout pattern may also vary with the application, that is, parallel, linear strips for rectangular diode glazing applications, circular strips like a phonograph record for round diode glazing applications, or a multiplicity of point focused lenses like small pyramids arranged in a "waffle pattern" may be used over corresponding holes in the reflective trapping layer.

Figure 3:
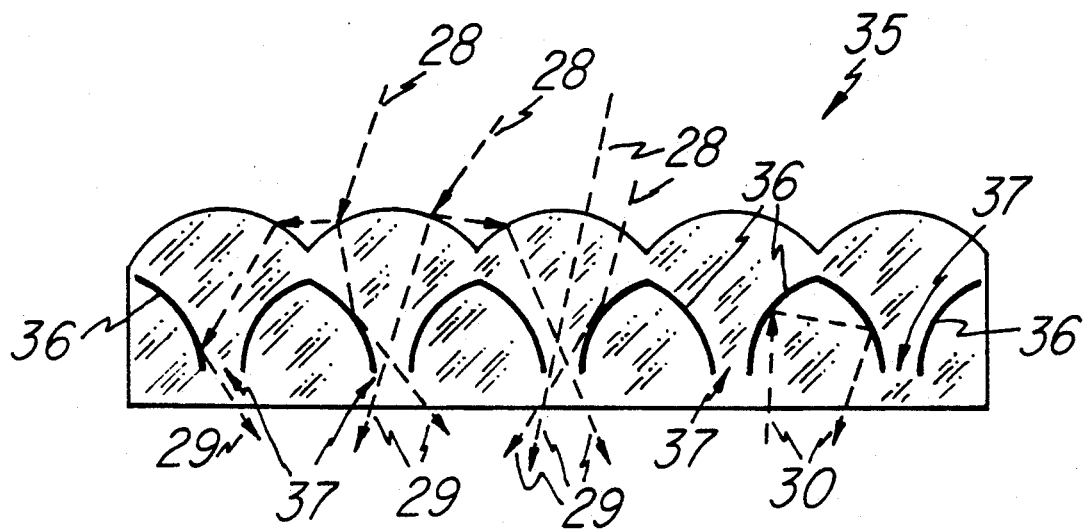
FIG. 3 is a side elevation view in cross-section of a diode glazing structure with circular reflectors, in accordance with still another preferred embodiment of the invention.

For example, another embodiment of the invention is shown in FIG. 3 in which the diode glazing structure 35 is shown with a plurality of convex circular cross-section trapping reflectors 36. The convex circular shaped trapping reflectors 36 assist in focusing the radiant energy 28 into the apertures 37.

Figure 4:
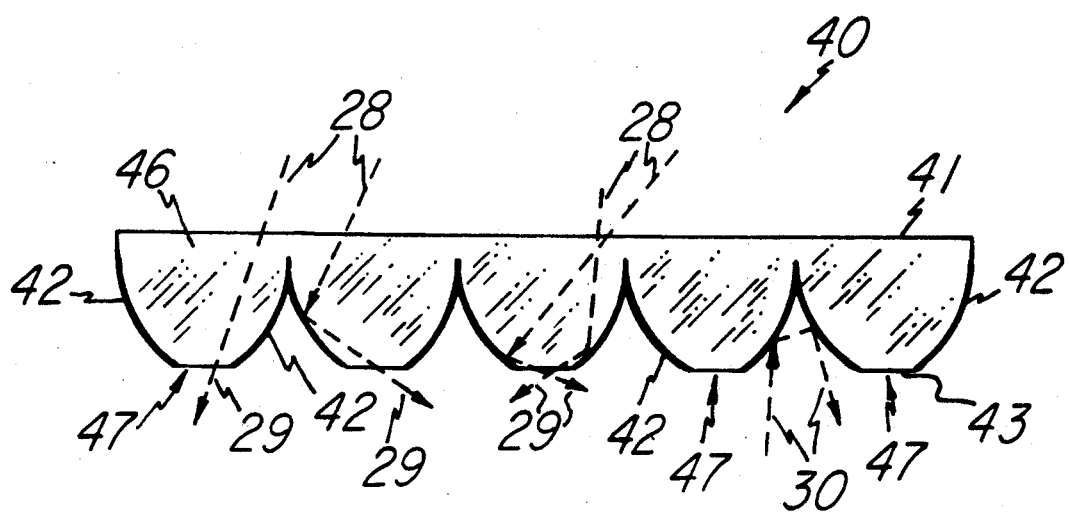
FIG. 4 is a side elevation view in cross-section of a diode glazing structure with a smooth top surface and with compound parabolic reflectors, in accordance with yet another preferred embodiment of the invention.

In the embodiment shown in FIG. 4 the diode glazing structure 40 has a flat top surface 41 and a plurality of concave compound-parabolic cross-section trapping reflectors 42 arranged on the bottom 43. The flat top surface 41 allows the diode glazing structure 40 to be thinner and possibly more economical. In the embodiment shown, the material of the planar body 46 has been omitted from the bottom 43 of the diode glazing structure 40, so that the trapping reflectors 42 serve as the bottom surface of the structure, as shown. Also, the shape of the concave compound-parabolic cross-section trapping reflectors 42 serves to assist in focusing the radiant energy 28 into the apertures 47, and when such a parabolic or compound parabolic set of reflectors are used the lenses on the top layer may be omitted.

Figure 5:
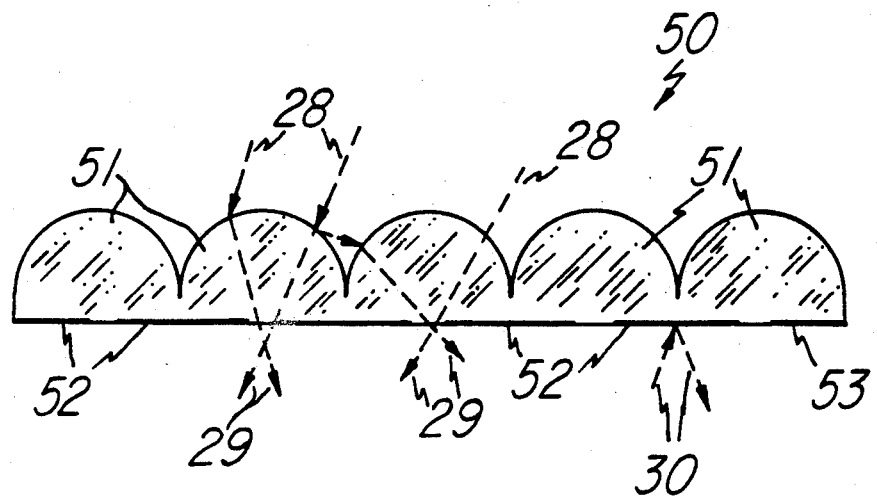
FIG. 5 is a side elevation view in cross-section of a diode glazing structure with flat reflectors, in accordance with still yet another preferred embodiment of the invention.

In the embodiment shown in FIG. 5 the diode glazing structure 50 has with a plurality of lens concentrators 51 of circular cross-section and a plurality of flat trapping reflectors 52 arranged along the flat bottom surface 53 of the structure. The operation of this embodiment is the same as that of the embodiments shown in FIGS. 1-4.

Figure 6:
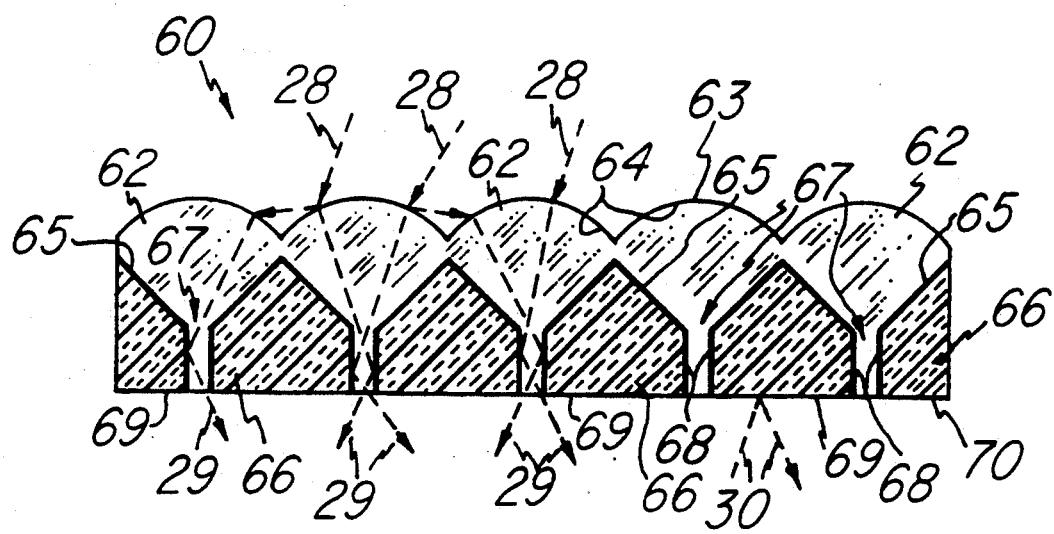
FIG. 6 is a side elevation view in cross-section of a diode glazing structure with inverted "V" shaped reflectors and a thermal insulation layer directly beneath, in accordance with still another preferred embodiment of the invention.

In the embodiment shown in FIG. 6, the diode glazing structure 60 has a plurality of lens concentrators 62 with antireflective coating 63 on their top surfaces 64. A plurality of inverted "V" shaped trapping reflectors 65 are provided in a manner similar to that of the embodiment of FIG. 1 described above. However, blocks 66 of thermal insulation are additionally provided between the bottom surfaces of the trapping reflectors 65 and the bottom of the diode glazing structure 60. The blocks 66 of thermal insulation may be of urethane foam or other suitable insulation material. The sides of the blocks 66 of thermal insulation are adjacent light passageways 67, the sidewalls of which are provided with reflective layer 68. The passageways 67 serve as light guides to direct the radiation inward to the bottom 70. Optical fibers may be used in the holes to transmit the radiation inward through the insulation layer. In addition, the bottom portions of the body beneath the blocks 66 of insulation are provided with a reflective layer 69. The operation of this embodiment of the diode glazing structure 60 is similar to the embodiments described above with respect to FIGS. 1–5, and, in addition, possible reflection may occur within the passageways 67 before exiting the bottom 70 of the diode glazing structure 60. On the other hand, most of the radiation 30 passing in the opposite direction, strikes the reflective layer 69 to reflected back. Moreover, heat conduction from the bottom surface of the diode glazing structure 60 is also blocked by the thermal resistance of the blocks 66 of thermal insulation.

Figure 7:
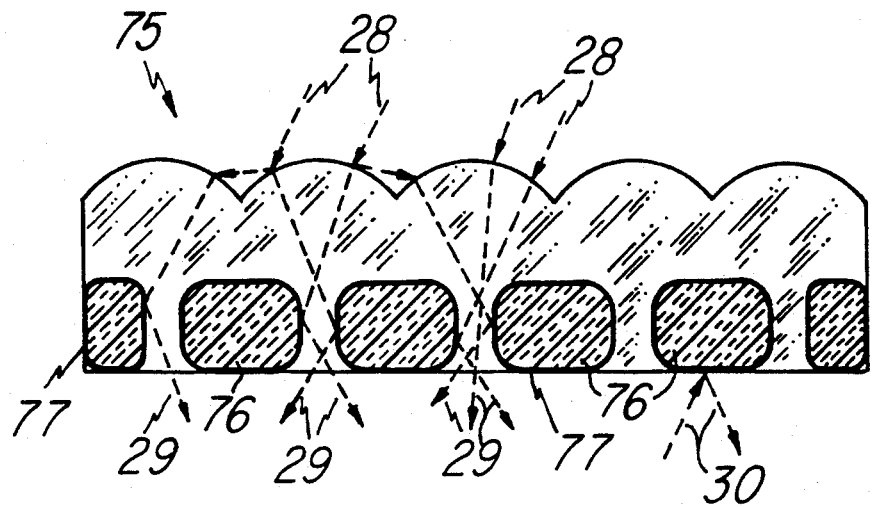
FIG. 7 is a side elevation view in cross-section with essentially flat reflectors and a thermal insulation layer directly beneath, in accordance with still another preferred embodiment of the invention.

In the embodiment shown in FIG. 7, the diode glazing structure 75 structure is similar to that described above with respect to the embodiment of FIG. 6, except that the blocks of thermal insulation 76 are of generally rectangular cross-sectional shape having a surrounding reflective coating 77. The diode glazing structure 75 thus has a plurality of flat reflectors surfaces for transmitting of concentrated radiation 28.

Figure 8:
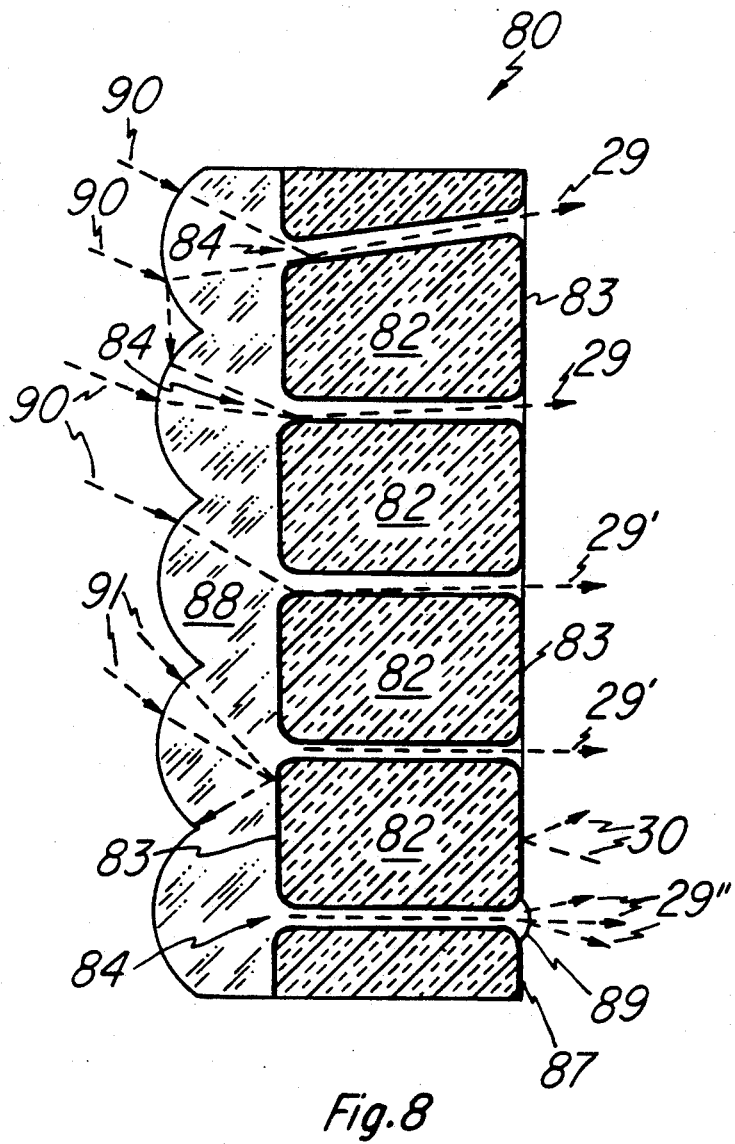
FIG. 8 is a side elevation view in cross-section with essentially flat reflectors and a thermal insulation layer with controlled light transmission, in accordance with still yet another preferred embodiment of the invention.

In the embodiment shown in FIG. 8, the diode glazing structure 80 has a plurality of blocks 82 of thermal insulation generally rectangular or quadrilateral cross-sectional shape each having a surrounding reflective coating 83. The blocks 82 are spaced to define light passageways 84, and, by appropriately adjusting the shapes of the blocks 82, the passageways 84 can be arranged to direct the light exiting the diode glazing structure 29 at different angles. For example, in this embodiment of the invention, with the diode glazing structure 80 arranged vertically, as shown, the passageways 84 at the top of the diode glazing structure 80 are angled upward so that the concentrated radiation 29 from these passageways 85 is angled upward. On the other hand, the radiation 29' from the passageways 85 in the center and lower portions of the diode glazing structure 80 is essentially normal to the bottom (inside) surface 87. Thus, the concentrated radiation 29 and 29' emitted from the various passageways 85 of the diode glazing structure 80 can be directed for example, for enhanced natural lighting of the ceiling and far walls of a room where the diode glazing structure is used. The diode glazing structure can therefore be used to enhance natural lighting and reduce heat losses in buildings where it is applied to windows and skylights to focus concentrated light into desired interior locations while maintaining high thermal resistance to heat loss from the buildings.

Additionally, if desired, additional special purpose lenses can be applied to the light exit points at one or more of the passageways 85. For example, a standard convex diffuser lens 89 is attached to the bottom passageway 85 to produce a diffused light pattern 29" emitted from the lens 89. Other types of diffuser lenses can be equally advantageously employed, such as Fresnel lenses, internally reflecting lenses, and the like.

Moreover, in the embodiment of FIG. 8 the arrangement of the blocks 82 of thermal insulation with respect to the lens concentrators 88 is such that incident radiation 90 during the winter range of incidence angles is absorbed and focused by the lens concentrators 88 to pass through the passageways 84 and out of the bottom surface 87, while the summer incident radiation 91 is absorbed and focused on the top (outside) portion of the reflector surfaces of the blocks 82 of thermal insulation. Thus, during summer, the incident radiation 91 is reflected, not transmitted. Moreover, such diode glazing structures can be designed to pass incident radiation only within a specified range of acceptance angles and reflect the radiation outside that range. It can therefore be used for thermal control on solar collectors, Trombe walls, greenhouses and passive solar buildings, for example, to allow sunlight to pass only during the winter but reflect the sunlight during the summer, as described above.

It will also be appreciated that the article of manufacture as herein described has additional applications, besides the traditional glazing applications described above. For example, a warm surface covered with a diode glazing structure of the type herein described will appear to have a significantly reduced temperature to observers and infrared detectors. Thus, diode glazing structures may be used to cover vehicles, structures, ships, and other objects with the result that these objects will have a increased degree of camouflage due to their reduced radiation signature.

Thus, when installed over a warm surface, diode glazing structure will reduce the apparent temperature of the covered surface. The apparent temperature of the surface as it would appear to an IR detector is called the IR signature of the warm surface relative to the temperature of the surroundings. The diode glazing structure would reduce the IR radiation emitted from the surface and this phenomena is referred to as "signature reduction."

Figure 9:
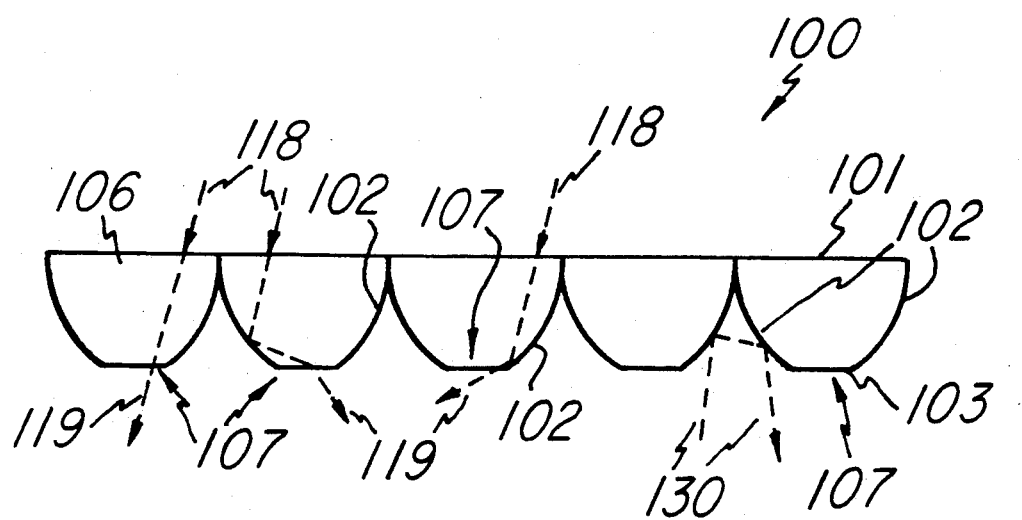
FIG. 9 is a side elevation view in cross-section with compound parabolic reflectors, in accordance with still yet another preferred embodiment of the invention.

For example, in the device embodiment 100 in FIG. 9 a radiation concentrating and reflecting structure is shown that is particularly suited for applications in which radiation signatures of structures are to be reduced. The term "structure" is used to include both permanent structures, such as buildings or the like, as well as moveable structures, such as aircraft, vehicles, or the like. The device 100, unlike the structures described above, does not include a special transparent material, but may be used in air, or other gas, or vacuum. The device 100 includes a plurality of reflective surfaces 102 that are spaced from each other to provide spaces or apertures 107 therebetween. The reflective surfaces are shown to have concave parabolic surfaces to direct and concentrate incident radiation 118 (such as light, radar, or other electromagnetic radiation) upon the top side 101 of the device 100 to be concentrated to within the spaces 107 at the bottom side 103 of the device 100, to exit, as shown by arrows 119. Thus, each pair of spaced reflectors 102 provide concentrating or focusing regions 106 to concentrate radiation incident on the top side 101 of the device 100. On the other hand, radiation that is incident upon the bottom side 103 of the device 100 is mostly reflected back, as shown by the dotted line 130.

In use, the device 100 can be located adjacent a structure of which it is desired to reduce its radiation signature. In such posture, radiation, such as radar or other electromagnetic radiation incident upon the top side 101 of the device 100, is mostly allowed to pass through the spaces 107 between the reflectors 102. On the other hand, reflections from the structure by which the device 100 is positioned are reflected back, as shown by the arrows 130, not being allowed to pass the device 100. The radiation signature of the structure, therefore, is minimized or reduced.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:
1. An article of manufacture, comprising:
a plurality of reflectors;
each of said plurality reflectors having top and bottom surfaces that are reflective to radiation,
said plurality of reflectors being spaced from each other to channel incident radiation on the top surfaces of said reflectors to pass within the spaces between said reflectors and to reflect incident radiation on the bottom surfaces of said reflectors back from said bottom reflective surfaces.
2. The article of manufacture of claim 1 further comprising a material that is transparent to incident radiation thereupon, said material having top and bottom surfaces and being disposed with said top surface above said plurality of spaced reflectors.
3. The article of manufacture of claim 2 wherein said material that is transparent to incident radiation thereupon is shaped to focus the radiation to the spaces between said reflectors.
4. The article of manufacture of claim 3 wherein said material that is transparent to incident radiation thereupon has a top surface shaped to form lenses to focus said radiation to the spaces between said reflectors.
5. The article of manufacture of claim 2 wherein said material that is transparent to radiation is a glazing material.
6. The article of manufacture of claim 2 wherein said material that is transparent to incident radiation thereupon is transparent to light.
7. The article of manufacture of claim 2 wherein said reflective surfaces are located within said material that is transparent to incident radiation thereupon.
8. The article of manufacture of claim 2 wherein said reflective surfaces are located beneath said material that is transparent to incident radiation thereupon.
9. The article of manufacture of claim 2 wherein said material that is transparent to incident radiation thereupon has a smooth top surface.
10. The article of manufacture of claim 2 wherein said reflective surfaces are flat "V" shaped surfaces separated along one side to provide a radiation passing aperture.
11. The article of manufacture of claim 2 wherein said reflective surfaces are approximately parabolic shaped surfaces.
12. A transparent glazing structure comprising:
a transparent material with a smooth top surface and a bottom surface;
a plurality of integral spaced reflectors arranged below said top surface of the transparent material in a pattern with spaces between said reflectors;
said reflectors having top and bottom surfaces arranged to channel radiation on the top surface of said reflectors to said spaces between said reflectors and to reflect incident radiation on the bottom surfaces of said reflectors back from said bottom reflective surfaces;
whereby most incident radiation on the smooth top surface is channeled through the spaces and out the bottom;
and whereby most of the radiation passing in the direction opposite to the incident radiation will strike the bottom of the reflectors and be reflected back out from the bottom.
13. The transparent glazing structure of claim 12 wherein said plurality of integral spaced reflectors are within said transparent material.
14. The transparent glazing structure of claim 12 wherein said plurality of integral spaced reflectors are below said transparent material.
15. The transparent glazing material of claim 12 wherein the top reflective surfaces are flat "V" shaped surfaces spaced to pass the concentrated radiation between them.
16. The transparent glazing material of claim 12 wherein the top reflective surfaces are concave parabolic surfaces joined at apexes and separated at their feet to provide a space therebetween to pass the channeled radiation.
17. A transparent glazing structure comprising:
a transparent material having top and bottom surfaces;
a plurality of reflectors arranged below said top surface and having spaces between them through which radiation can pass;
a plurality of concentrating lenses formed in the top surface of said transparent material configured to focus incident radiation on the top surface of said transparent material to pass through the spaces between said reflectors,
said reflectors having top and bottom surfaces arranged to channel radiation on the top surface of said reflectors to said spaces between said reflectors and to reflect incident radiation on the bottom surfaces of said reflectors back from said bottom reflective surfaces,
whereby substantially all of the radiation within a predetermined range of incidence angles upon the top surface of said transparent material passes through said transparent glazing structure, and most of the incident radiation upon the bottom surface of said transparent material is reflected to not pass through said transparent glazing structure.
18. The transparent glazing structure of claim 17 wherein the reflectors are flat "V" shaped surfaces joined at their apexes and separated at their feet to provide the spaces to pass the focused radiation.
19. The transparent glazing structure of claim 17 wherein the top reflective surfaces are curved surfaces joined at their apexes and separated at their feet, whereby focused radiation is channeled to pass through the space between the reflectors and to pass out the bottom surface of said transparent material.
20. The transparent glazing structure of claim 17 wherein said concentrating lenses, said reflectors, and the spaces between the reflective surfaces are arranged in parallel linear strips to provide linear strips of focused radiation.

21. The transparent glazing structure of claim 17 wherein said concentrating lenses and said reflectors are arranged in a regular waffle-iron pattern.

22. The transparent glazing structure of claim 17 wherein said concentrating lenses and said reflective surfaces are arranged in a circular phonograph-record pattern of small circular lens segments.

23. The transparent glazing structure of claim 17 further comprising blocks of insulation material on the bottom surface of said transparent material arranged with spaces to allow the radiation that passes through the spaces between said reflectors to pass.

24. A method for reducing the radiation signature of a structure, comprising:
providing a material that is transparent to incident radiation thereupon, said material having top and bottom surfaces that are reflective to radiation;
providing a plurality of spaced reflectors below said top surface, said reflectors having top and bottom surfaces arranged to channel incident radiation on the top surface of said reflectors to spaces between said reflectors and to reflect incident radiation on the bottom surface of said reflectors back from said bottom reflective surfaces.

25. The method of claim 24 wherein said step of providing a material comprises providing a glazing material.

26. The method of claim 25 wherein said step of providing a glazing material comprises providing a glazing material that is transparent to light.

27. The method of claim 24 wherein said structure is a vehicle.

28. The method of claim 24 wherein said structure is a building.

29. The article of manufacture of claim 1 wherein said plurality of reflectors are approximately parabolic shaped surfaces.

30. The article of manufacture of claim 1 wherein the plurality of reflectors are parabolic surfaces that are concave on an upwardly facing surface and joined at adjacent apexes and separated at their feet to provide a space therebetween to pass channeled radiation.

31. The article of manufacture of claim 1 wherein said reflectors are of aluminum foil.

32. The article of manufacture of claim 1 wherein said reflectors are of silver foil.

33. The article of manufacture of claim 1 wherein said reflectors are of silvered mylar film.

34. The article of manufacture of claim 1 wherein said article is a hollow structure containing said plurality of reflectors.

35. The article of manufacture of claim 34 wherein said hollow structure is located within a vacuum.

36. The article of manufacture of claim 34 wherein said hollow structure is located within a gas.

37. The article of manufacture of claim 1 wherein said bottom reflective surfaces are structured to reflect incident electromagnetic radiation.

38. The article of manufacture of claim 37 wherein said bottom reflective surfaces are structured to reflect incident electromagnetic radar radiation.

39. The article of manufacture of claim 37 wherein said bottom reflective surfaces are structured to reflect incident electromagnetic light radiation.

40. The article of manufacture of claim 37 wherein said bottom reflective surfaces are structured to reflect incident electromagnetic infrared radiation.

* * * * *